United States Patent [19]
Torta et al.

[11] 4,210,303
[45] Jul. 1, 1980

[54] SUPPORT AND GUIDE DEVICE FOR ADJUSTABLE VEHICLE SEATS

[75] Inventors: Franco Torta, Beinasco; Mario Torta, Turin, both of Italy

[73] Assignee: Lifel di Torta Franco & C. s.a.s., Beinasco, Italy

[21] Appl. No.: 900,378

[22] Filed: Apr. 26, 1978

[30] Foreign Application Priority Data

Jun. 3, 1977 [IT] Italy .............................. 68287 A/77

[51] Int. Cl.² ........................ F16M 13/00; B60N 1/02
[52] U.S. Cl. ................................... 248/429; 248/393; 296/65 R
[58] Field of Search ............... 248/429, 430, 393, 397; 296/65 R; 308/3.6; 312/333, 346, 347

[56] References Cited

U.S. PATENT DOCUMENTS

| | | | |
|---|---|---|---|
| 3,184,209 | 5/1965 | Colautti | 248/429 |
| 3,843,087 | 10/1974 | Adams | 248/430 |
| 3,847,452 | 11/1974 | Harder, Jr. | 312/341 NR |

FOREIGN PATENT DOCUMENTS

| | | | |
|---|---|---|---|
| 2559653 | 6/1977 | Fed. Rep. of Germany | 248/393 |
| 687090 | 2/1953 | United Kingdom | 248/430 |

*Primary Examiner*—James T. McCall
*Attorney, Agent, or Firm*—Sughrue, Rothwell, Mion, Zinn and Macpeak

[57] ABSTRACT

A support and guide device for an adjustable seat of the kind fitted to motor vehicles comprises a pair of fixed elongate generally U-shape guides with outwardly turned lateral flanges for attachment to the vehicle floor, a pair of cooperating movable guides for attachment to the seat, the movable guides being elongate and generally U-shape in cross section, the arms of which are shaped to fit over the lateral flanges of the fixed guides, and a latching device housed entirely between one of the fixed guides and the associated movable guide and comprising a shaft carrying one or more teeth for engagement in a row of windows in a ridge formed in the base of the fixed guide to hold the seat in a selected position and so positioned that neither the windows in the guide nor the teeth of the shaft are exposed in any adjustment of the seat.

12 Claims, 6 Drawing Figures

U.S. Patent  Jul. 1, 1980  Sheet 1 of 2  4,210,303
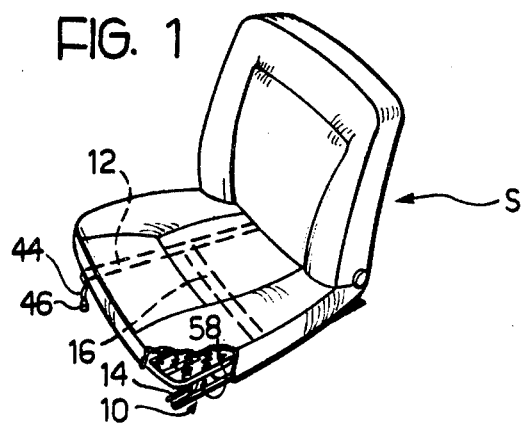
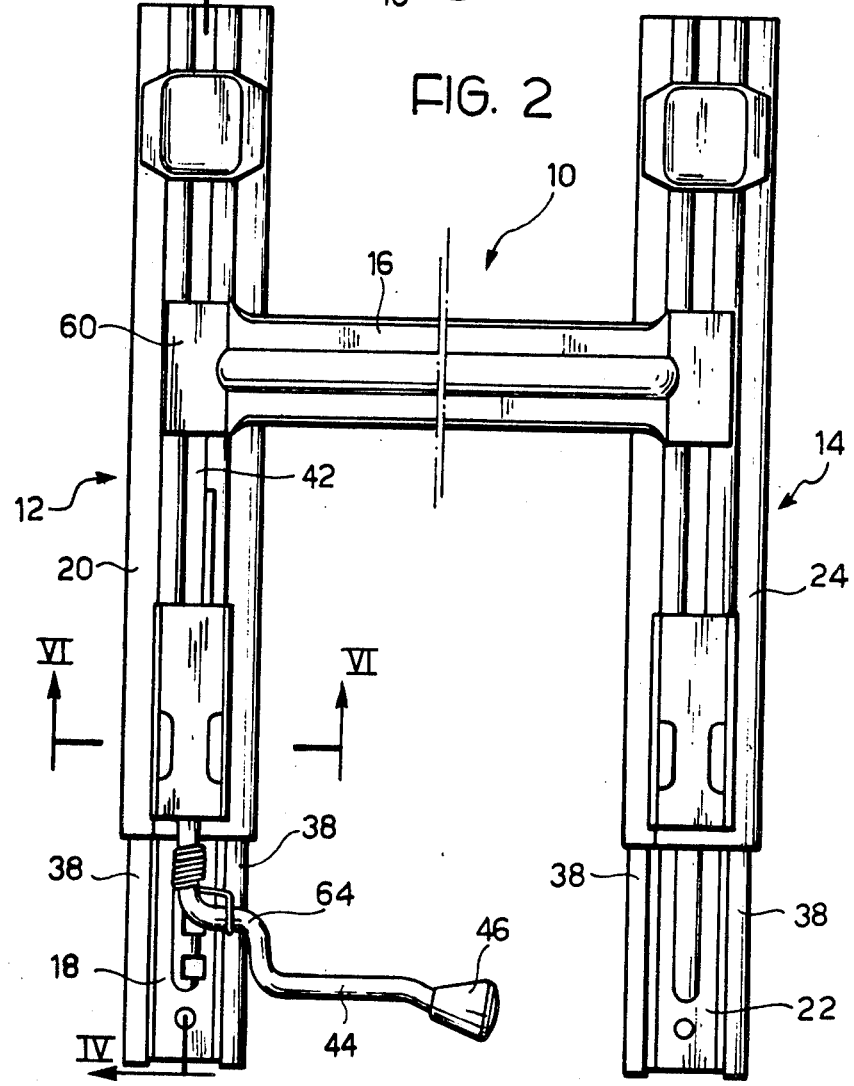

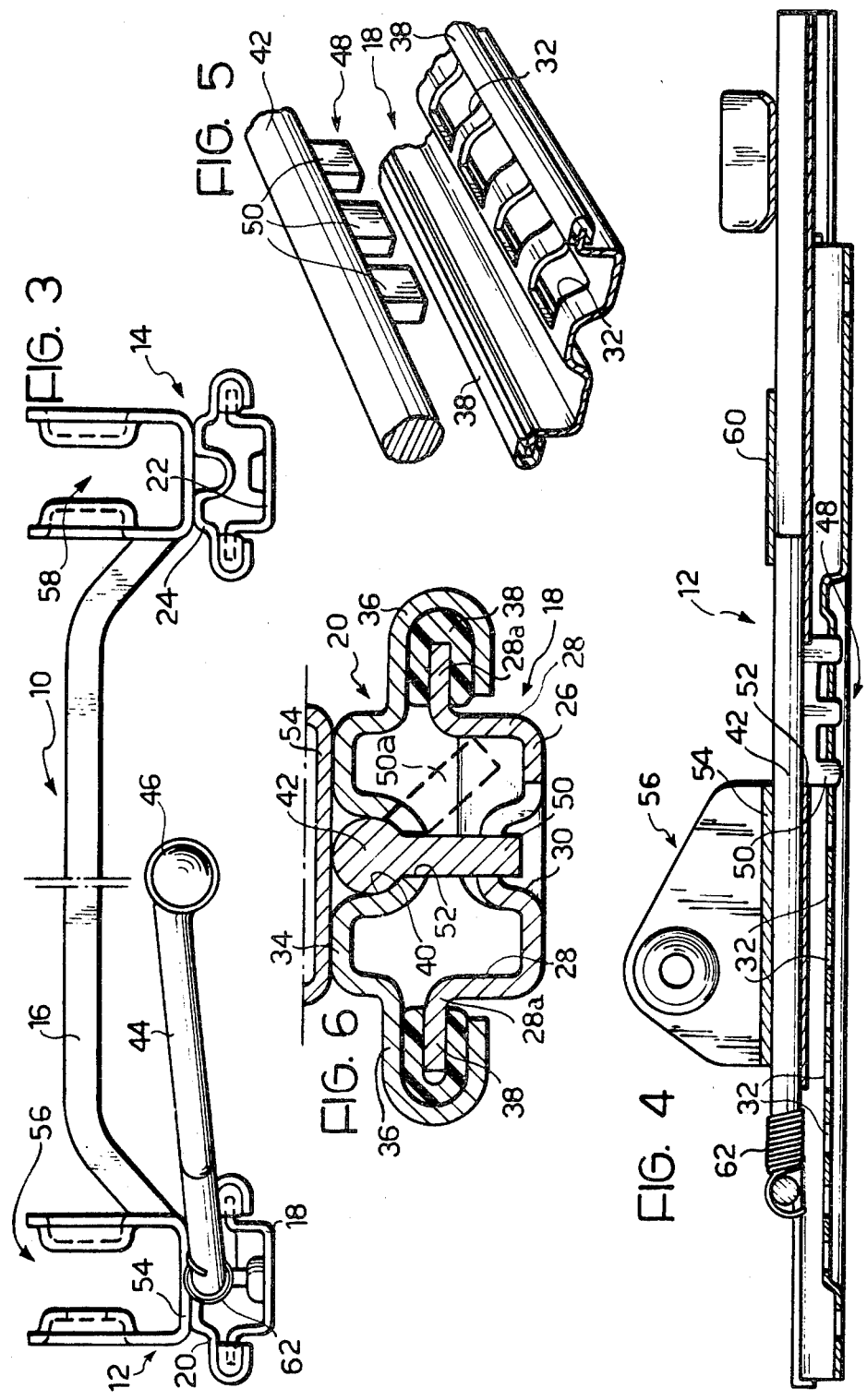

SUPPORT AND GUIDE DEVICE FOR ADJUSTABLE VEHICLE SEATS

BACKGROUND OF THE INVENTION

The present invention relates to a support and guide device suitable for the kind of adjustable seats often fitted to automobiles. Such devices include a pair of fixed guides, which in use are attached to the floor of the automobile, each of which comprises a pressed sheet metal strip having a rather flattened U-shape in cross section with a base portion and two lateral flanges directed outwardly, and a pair of movable guides which in use are attached to the seat structure and each of which comprises sheet metal strip also having a generally flattened U-shape in cross section, with a base portion and two side portions which latter are folded to form lateral channels so shaped that when the movable guides are inverted and attached to the underside of a seat structure the channels surround respective flanges of the fixed guides and can slide axially along them. One pair of guides (i.e. one fixed and one movable guide) is provided with means fixing the guides in a selected relative position, such means usually comprising a series of notches in the fixed guide into which can engage one or more teeth on an adjustment shaft or lever mounted on the seat structure and provided with a control level or knob manually operable to disengage the tooth or teeth from the notches and resiliently biased towards a position of engagement of the tooth or teeth in the notches.

In one known device of this kind, the teeth are carried on a shaft which extends parallel to the length of and is mounted rotatably on an outer part of one of the movable guides; and the cooperating notches are formed in the edge of the outer flange of the associated fixed guide. At the position where the tooth or teeth project from the shaft, a length of the side portion on one side of the movable guide is removed to allow access for the tooth or teeth to engage in the notches.

A fundamental disadvantage of an adjustment mechanism of this kind is that the notches and teeth both have exposed sharp edges which may cause injury or tear clothing.

OBJECTS OF THE INVENTION

The main object of the present invention is to provide a support and guide device for an adjustable seat of the type fitted to automobiles which does not have sharp edges exposed as a potential cause of damage to the clothing of a user.

A further object of the invention is to provide an automobile seat support and guide device for an automobile seat in which an adjustment lever requires only a small displacement between engaged and disengaged positions, allowing this to be positioned beneath a seat having very low clearance.

Another object of the invention is to provide an automobile seat support and adjustment device which is cheap to manufacture but is rugged and sturdy in use.

SUMMARY OF THE PRESENT INVENTION

The above mentioned objects are achieved by means of a support and guide device for an automobile adjustable seat, of the type including a pair of fixed guides adapted to be fixed to the floor of the vehicle, each said fixed guide comprising an elongate sheet metal element having a flattened generally U-shape cross section including a base portion, two side arms projecting from said base portion, outwardly directed flanges projecting from said side arms, said flanges extending at least part way along the length of said side arms; a pair of movable guides adapted to be fixed to said motor vehicle seat, each said movable guide comprising an elongate sheet metal element having a flattened generally U-shaped cross section, including a base portion, two side arms projecting from said base portion, said side arms being formed with C-shape portions extending at least part way along their length, which C-shape portions surround said outwardly directed flanges of respective fixed guides, and latching means mounted on one of said movable guides and selectively engageable with one of said fixed guides whereby to permit or prevent relative sliding movement between said one fixed and said one movable guide, said latching means including a series of notches in said one fixed guide, a shaft extending longitudinally of said one movable and said one fixed guides, at least one tooth projecting from said shaft, a control lever connected to said shaft by means of which it can be turned about its axis between a first position in which said at least one tooth is engaged in one of said notches in said one fixed guide to prevent relative sliding movement between said fixed and movable guide and a second position displaced from said notches permitting free relative sliding movement between said fixed and movable guides, and resilient biasing means urging said shaft towards said first position thereof, wherein said notches are formed as a series of windows in said base portion of said fixed guide spaced from the edge thereof, and said shaft is mounted so as to be turnable about its own axis on said base portion of said one movable guide and within the transverse width of said base portion.

The advantage of such a device is that there are no sharp edges exposed by the notches or the teeth because they are both located within the boundaries of the fixed guide. Moreover, the tooth or teeth of the shaft can be so positioned that at no state of adjustment of the seat are they exposed through the guides.

Other features and advantages of the invention will become apparent from a study of the following description in which reference is made to the accompanying drawings, and which is provided purely by way of non-restrictive example.

BRIEF DESCRIPTION OF THE DRAWINGS

FIG. 1 is a general perspective view of an adjustable seat for an automobile, having a support and guide device formed as an embodiment of the invention;

FIG. 2 is a plan view of a preferred embodiment of the invention;

FIG. 3 is a front view of the embodiment illustrated in FIG. 2;

FIG. 4 is a longitudinal section taken on the line IV—IV of FIG. 2;

FIG. 5 is an exploded perspective view of a part of the fixed guide element showing that part of the shaft on which are formed the teeth for engagement in the notched or windows of the fixed guide element; and FIG. 6 is a cross section, on an enlarged scale, taken on the line VI—VI of FIG. 2.

DESCRIPTION OF THE PREFERRED EMBODIMENTS

Referring now to FIG. 1, there is shown an automobile tip-up seat generally indicated S, supported by a support and guide device 10 comprising two guide assemblies 12 and 14 interconnected by a cross member 16.

As illustrated in FIGS. 2 and 3, the guide assembly 12 includes a fixed guide 18, adapted to be attached fixedly to the floor of the automobile, and a movable guide 20; the other guide assembly 14 likewise includes a fixed guide 22 and a movable guide 24. The two movable guides 20 and 24 are interconnected by the cross member 16. The fixed and movable guides, and the cross member 16, are made of strong pressed sheet metal, and the cross member 16 is secured strongly to the two movable guides 20 and 24 by means of welding.

The left hand guide assembly 14 differs from the right hand guide assembly 12 only in that the guides 22, 24 thereof are not provided with means for latching the seat in its adjusted position, as are the guides 18, 20 of the right hand assembly 12. The left hand assembly 14 will therefore not be described in detail, it being understood that the guides of the left hand assembly 14 are identical with the guides of the right hand assembly 12 except for the latching means.

As can be seen in FIGS. 2 and 6, the fixed guide 18 is shaped along its length with a substantially flattened U-shape cross section comprising a base part 26 and two sides 28, the upper parts of which are turned outwardly to form two horizontal flanges 28a. The base part 26 has, extending along the centre, an embossed upstanding ridge 30 which forms a channel in the underside of the guide. In this ridge 30, along the length of the guide 18 are formed a series of equidistant windows 32 which have a rectangular shape in plane. The windows 32 extend transversely across the top of the ridge 30, down one side thereof and into the bottom 26 of the U-shaped fixed guide 18.

Along the length of the movable guide 20, or at least along the greater part of its length, it has a flattened generally U-shape in cross section (the U being inverted in the position of use) comprising a base portion 34 and two lateral arms 36 which are bent to a C-shape cross section facing one another.

Attached to the lateral flanges 28a of the fixed guide 18 are respective strips of plastics material having a generally C-shape cross section. The plastics material is preferably a polyamide having a low coefficient of friction, or a self lubricating material. The strips 38 are attached to the respective lateral flanges of the associated fixed guide 18 by means of adhesive bonding or any other suitable attachment means.

The outer curve of the C-shape strips 38 corresponds closely to the inside curve of the C-shape arm 36 within which they are housed. The use of the strips 38 provides a number of notable advantages over the known guides, as it makes sliding movement of the movable guides along the fixed guides possible without requiring grease, which was required in the prior art guide devices where there was direct metal-to-metal contact between the fixed and movable guides. The absence of grease has the advantage of cleanliness, since grease acts to retain dirt or dust, to dirty clothing, hands or anything else which comes into contact with it.

The base 34 of the movable guide has an embossed channel 40 forming on an inner surface a ridge projecting towards the fixed guide. In this channel 40 there is mounted a shaft 42, the forward end of which projects forwardly from the movable guide 20; this projecting end is bent in such a way as to form an operating lever 44, and is provided with a knob 46: the shaft 42 is free to turn about its axis within the channel 40.

Near the rear of the shaft 42 are located engagement means, generally indicated 48, in the form of three radially projecting teeth 50 having substantially the same lengthwise dimension as the windows or notches 32 and the same spacing as they have. As may be seen in FIGS. 4 and 5, the latch as a whole has a similar configuration to that of a key, the teeth 50 of which form the strikers, whilst the shank of the key is formed by shaft 42.

The teeth 50 project through a wide slit 52 in the bottom of the channel 40: the length of the slit 52 is equal to, or slightly greater than, the length of the latch 48. In this way, the edges of the end teeth 50 in the row abut against the ends of the slit, preventing axial displacement of the shaft 42.

The channel 40 has a semicircular bottom to form a good supporting bearing for the shaft 40. Moreover, the depth of the channel 40 is substantially equal to the diameter of the shaft 42, so that the shaft 42 does not project above the upper face of the base portion 34 of the movable guide 20. The shaft 42 is thus snugly fitted into the channel 40 by fixing flat cover plates 54 to the upper face of the base portion 34 welded to it. However, the shaft may be mounted in a different manner from that illustrated and described without departing from the scope of the present invention. For example, the base portion 34 may be completely flat and the shaft 42 may be mounted for rotation about its own axis either above or below the base portion, such as by means of U-brackets.

In the embodiment illustrated, the cover plates 54 advantageously form at the same time attachment and/or support members of the seat structure. Thus, as can be seen in FIG. 3, a front cover plate 54 forms part of a fork or bracket 56 which, together with an identical bracket 58 on the movable guide 24, serves as the front pivot of the tip-up seat S. Another cover plate is formed on each movable guide by the corresponding flat ends 60 of the crosspiece 16.

The cover plates would normally be fixed in position at the time when the seat S is attached with its support and guide device, in which case the shaft 42 will be provisionally fixed before this by means of suitable temporary cover elements fixed by tacking points such as, for example, by means of adhesive tape.

The teeth 50 of latch 48 are normally engaged in the windows 32 in the fixed guide 18 to hold the seat S in its selected position. Adjustment of the seat S is effected simiply to turning the lever 44 (anticlockwise as viewed in FIG. 3) to disengage the teeth 50 from the windows 32 (the disengaged position of the teeth 50 is shown in broken outline 50a in FIG. 6). The position of the seat along the fixed guides 18, 22 can then be adjusted, sliding the seat carrying the movable guides 20, 24 forward or backward as required whilst still holding the knob 46 up to keep the teeth 50 disengaged from the windows 32. Upon release of the knob 46 the shaft 42 is returned by resilient biasing means in to a position in which the teeth 50 engage in windows 32 (that is in the clockwise direction as viewed in FIG. 3).

The resilient biasing is, as shown in the preferred embodiment, preferably obtained by means of a simple torsional helical spring 62. This spring is wound around that part of the shaft 42 which projects forwardly of the movable guide 16 and has one end engaged with the lower face of this guide and the opposite end engaged around a section 64 of the lever 44 which joins the shaft 42 to the lever 44.

The form and position of the windows 32, that is occupying a part of the crest and one side of the embossed ridge 30 allows the teeth 50 to engage and disengage therefrom with a rotation of the shaft 42 much less than that which would be necessary if the windows 32 were made in a flat surface. This means that the angle through which the lever 44 needs to be moved in adjusting the seat is very small, and this lever may thus be hidden below the cushion of seat S, even if this cushion is very low in relation to the floor.

What is claimed is:

1. In a support and guide device for an automobile adjustable seat, of the type including:
   a pair of fixed guides adapted to be fixed to the floor of the vehicle, each said fixed guide comprising:
      an elongated sheet metal element having a flattened generally U-shape cross section including:
         a base portion, two side arms projecting from said base portion,
         outwardly directed flanges projecting from said side arms, said flanges extending at least part way along the length of said side arms;
   a pair of movable guides adapted to be fixed to said automobile seat, each said movable guide comprising:
      an elongate sheet metal element having a flattened generally U-shape cross section including,
      a base portion,
      two side arms projecting from said base portion, said side arms being formed with C-shape portions extending at least part way along their length, which C-shape portions surround said outwardly directed flanges of respective fixed guides in slidable relation thereto, so that each fixed guide and the respective movable guide define an elongated space therebetween; and
   latching means mounted on one of said movable guides and selectively engageable with one of said fixed guides whereby to permit or prevent relative sliding movement between said one fixed and said one movable guide, said latching means including:
      a series of notches in said one fixed guide,
      a shaft extending longitudinally of said one movable and said one fixed guides,
      at least one tooth projecting from said shaft;
      a control lever connected to said shaft by means of which it can be turned about its axis between a first position in which said at least one tooth is engaged in one of said notches in said one fixed guide to prevent relative sliding movement between said fixed and movable guide and a second position displaced from said notches permitting free relative sliding movement between said fixed and movable guides, and
   resilient biasing means urging said shaft towards said first position thereof;
   the improvement wherein said notches are formed as a series of windows in said base portion of said fixed guide spaced from the edge thereof, and
   said shaft is mounted so as to be turntable about its own axis on said base portion of said one movable guide and within the transverse width of said base portion, said at least one tooth extending radially from said shaft, and lying in the same plane as the axis of said shaft.

2. The device of claim 1, wherein there are a plurality of teeth spaced along said shaft and lying in the same plane.

3. The device of claim 1, wherein the base portion of said one movable guide has an embossed channel defining a longitudinal cavity facing away from said one fixed guide, said shaft being mounted for rotation about its own axis in said channel,
   plurality of covers attached to the face of said base portion remote from said one fixed guide holding said shaft in place,
   an opening in said channel through which said at least one tooth projects into the space between said one movable and said one fixed guide to engage in said windows.

4. The device of claim 3, wherein said channel has a U-shape cross section with a semicircular bottom and a height substantially equal to the diameter of said shaft, and wherein said covers have a flat part fixed to the face of said base portion of said one movable guide on each side of said channel therein.

5. The device of claim 4, wherein said covers form part of attachment members of said seat structure.

6. The device of claim 4, wherein said covers form part of a crosspiece connecting said two movable guides.

7. The device of claim 4, wherein said covers form part of support members of said seat structure.

8. The device of claim 3, wherein the length of said opening in the bottom of said channel through which projects said at least one tooth is of substantially the same length, parallel to the axis of said shaft as said at least one tooth, whereby to prevent axial displacements of said shaft with respect to said movable guide.

9. The device of claim 1, wherein a part of said shaft projects forwardly of said one movable guide and said resilient biasing means is a torsional helical spring wound around said forwardly projecting part of said shaft, one end of said spring being engaged with the lower face of said one movable guide and the other end being engaged with a portion of said forwardly projecting part of said shaft extending transversely with respect to the axis of said shaft.

10. The device of claim 1, wherein said outwardly turned flanges of each said fixed guide carry respective elongate strips of plastics material of low coefficient of friction having a C-shape cross section, the outer surface of said elongate strips of plastics material having the same shape in cross section as the inner surface of said C-shape portion of said side arms of said movable guides.

11. In a support and guide device for an automobile adjustable seat, of the type including:
   an elongate sheet metal element having a flattened generally U-shape cross section including:
      a base portion,
      two side arms projecting from said base portion,
      outwardly directed flanges projecting from said side arms, said flanges extending at least part way along the length of said side arms;
   a pair of movable guides adapted to be fixed to said automobile seats, each said movable guide comprising:
      an elongate sheet metal element having a flattened generally U-shape cross section including,
      a base portion,
      two sides arms projecting from said base portion, said side arms being formed with C-shape portions extending at least part way along their length, which C-shape portions surround said outwardly directed flanges of respective fixed guides in slidable relation thereto, so that each fixed guide and the respective movable guide define an elongated space therebetween; and latching means mounted on one of said movable guides and selectively engageable with one of said fixed guides whereby to permit or prevent relative sliding movement between said one fixed and said one movement guide, said latching means including:

a series of notches in said one fixed guide, a shaft extending longitudinally of said one movable and said one fixed guides, at least one tooth projecting from said shaft, a control lever connected to said shaft by means of which it can be turned about its axis between the first position in which said at least one tooth is engaged in one of said notches in said one fixed guide to prevent relative sliding movement between said fixed and movable guide and a second position displaced from said notches permitting free relative sliding movement between said fixed and movable guides, and resilient biasing means urging said shaft towards said first position thereof;

the improvemement wherein said notches are formed as a series of windows in said base portion of said fixed guide spaced from the edge thereof, and said shaft is mounted so as to be turnable about its own axis on said base portion of said one movable guide and within the transverse width of said base portion, said base portion of said one fixed guide having an embossed channel forming a ridge extending axially of said one fixed guide and projecting towards said one movable guide, said windows in said one fixed guide being formed in this ridge and extending, in a direction transverse the axis of said one fixed guide, from the crest of said ridge down one side thereof and into the base portion of said one fixed guide, said resilient biasing means urging said shaft to rotate about its axis to an angular position in which said at least one tooth is engaged in a window and in contact with the side thereof formed in the crest of said ridge, disengagement of said at least one tooth from the window in which it is lodged being effected by rotating said shaft in a direction such as to carry said at least one tooth away from that part of the window in the side of said ridge.

12. In a support and guide device for an automobile adjustable seat, of the type including:

a pair of fixed guides adapted to be fixed to the floor of the vehicle, each said fixed guide comprising;

an elongate sheet metal element having a flattened generally U-shape cross section including:

a base portion, two side arms projecting from said base portion, outwardly directed flanges projecting from said side arms, said flanges extending at least part way along the length of said side arms;

a pair of movable guides adapted to be fixed to said automobile seat, each said movable guide comprising:

an elongate sheet metal element having a flattened generally U-shape cross section including, a base portion, two side arms projecting from said base portion, said side arms being formed with C-shape portions extending at least part way along their length, which C-shape portions surround said outwardly directed flanges of respective fixed guides in slidable relation thereto so that each fixed guide and the respective movable guide define an elongated space therebetween; and latching means mounted on one of said movable guides and selectively engageable with one of said fixed guides whereby to permit or prevent relative sliding movement between said one fixed and said one movable guide, said latching means including:

a series of notches in said one fixed guide, a shaft extending longitudinally of said one movable and said one fixed guides;

at least one tooth projecting from said shaft, a control lever connected to said shaft by means of which it can be turned about its axis between a first position in which said at least one tooth is engaged in one of said notches in said one fixed guide to prevent relative sliding movement between said fixed and movable guide and a second position displaced from said notches permitting free relative sliding movement between said fixed and movable guides, and resilient biasing means urging said shaft towards said first position thereof;

the improvement wherein said notches are formed as a series of windows in said base portion of said fixed guide spaced from the edge thereof, and said shaft is pivotally supported on the base portion of said one movable guide, said at least one tooth projecting from said shaft into said space through an opening of the base portion of said one movable guide, so as to be disposed completely within said said space both when said shaft is in its first position and when said shaft is in its second position.

* * * * *